(12) United States Patent
Prajapat et al.

(10) Patent No.: US 10,673,908 B2
(45) Date of Patent: Jun. 2, 2020

(54) DEVICES AND SYSTEMS FOR VOICE OVER INTERNET PROTOCOL CODEC SELECTION

(71) Applicant: Edgewater Networks, Inc., San Jose, CA (US)

(72) Inventors: Surendra Prajapat, Cupertino, CA (US); Timothy B. Dentry, McKinney, TX (US)

(73) Assignee: Edgewater Networks, Inc., San Jose, CA (US)

( * ) Notice: Subject to any disclaimer, the term of this patent is extended or adjusted under 35 U.S.C. 154(b) by 0 days.

(21) Appl. No.: 16/002,867

(22) Filed: Jun. 7, 2018

(65) Prior Publication Data

US 2019/0379708 A1     Dec. 12, 2019

(51) Int. Cl.
*H04L 1/00*       (2006.01)
*H04L 29/06*      (2006.01)
*H04L 29/12*      (2006.01)

(52) U.S. Cl.
CPC ...... *H04L 65/1069* (2013.01); *H04L 61/1529* (2013.01); *H04L 65/608* (2013.01); *H04L 65/80* (2013.01)

(58) Field of Classification Search
CPC ..... H04L 29/06; H04L 41/5009; H04L 43/00; H04L 43/0829; H04L 43/0852; H04L 43/087
See application file for complete search history.

(56) References Cited

U.S. PATENT DOCUMENTS

| 7,643,414 B1 * | 1/2010 | Minhazuddin ........ H04L 47/822 370/230 |
| 9,338,303 B2 * | 5/2016 | Lynch ..................... H04M 7/12 |
| 2019/0058797 A1 * | 2/2019 | Clark ................... H04B 17/318 |

* cited by examiner

*Primary Examiner* — Phuc H Tran
(74) *Attorney, Agent, or Firm* — Brooks, Cameron & Huebsch, PLLC

(57) ABSTRACT

Devices and systems for voice over Internet protocol (VoIP) codec selection are described herein. One or more embodiments include a VoIP device for selecting a codec comprising a link monitor to detect an Internet link and an interface coupled to the link monitor, wherein the interface determines a bandwidth, usage, and/or type of the Internet link to select the codec.

20 Claims, 2 Drawing Sheets

DEVICES AND SYSTEMS FOR VOICE OVER INTERNET PROTOCOL CODEC SELECTION

TECHNICAL FIELD

The present disclosure relates to devices and systems for voice over Internet protocol codec selection.

BACKGROUND

Many organizations use a voice over Internet protocol (VoIP) communication system to communicate rather than a traditional telephone communication system. As with all communication systems, the ability to connect the parties wanting to speak to each other over a VoIP system and to maintain that connection, during their intended communication period, is important. Detrimental conditions associated with the Internet link quality can negatively affect a user's experience.

Some keys to connecting and maintaining that connection are matching the Internet link with a particular codec that minimizes disruptions and conserves resources.

Some systems utilize a redundant link that can be switched to, if a primary link is having difficulty maintaining the connection or the quality of the connection which is affecting the parties' ability to communicate with each other.

In some such systems, the primary and redundant links can be used by a VoIP device, for example, having two public wide area network (WAN) data links, one for a primary connection and one for redundancy, in case the primary link becomes unreliable or inaccessible. The primary and redundant links can have different bandwidths, different usage, and can be different types of links. In response to a new Internet link being used, a current codec or a new codec servicing the new Internet link can be selected.

Similar to Internet links, there can be different types of codecs and codecs can have different bandwidths. For example, a primary link can have a high bandwidth connected to a high bandwidth codec. In response to disruptions, the Internet link can change from the primary link to a low bandwidth redundant link.

In this example, a high bandwidth codec is being underutilized by a low bandwidth Internet link. VoIP communication resources can be wasted when a codec is not selected based on the bandwidth, usage, and/or type of Internet link. In some examples, an Internet link quality can change during a course of a call and can initiate the use of a lower bandwidth or adaptive codec to account for the bandwidth degradation.

DETAILED DESCRIPTION

Figure 1:
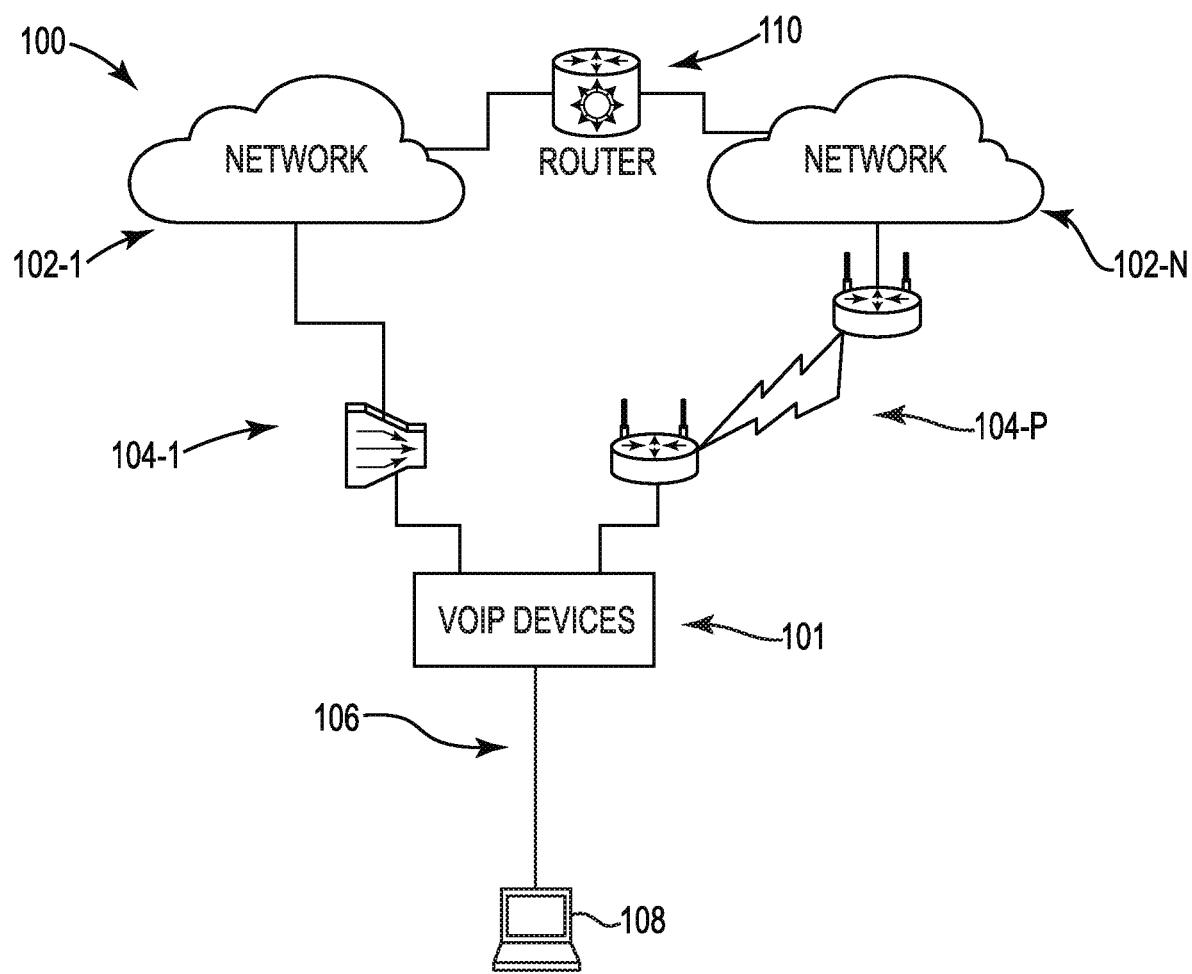
FIG. 1 illustrates an example of a system including voice over Internet protocol (VoIP) devices according to one or more embodiments of the present disclosure.

In the embodiments of the present disclosure, a voice over Internet protocol (VOIP) device and/or edge device can be used for selecting a codec. The edge device can be acting as a back-to-back user agent for a VOIP device upstream, for example.

The device can include a link monitor to detect an Internet link and an interface coupled to the link monitor. In some examples, the interface can determine a bandwidth, usage, and/or type of the Internet link.

The bandwidth, usage (e.g., voice and/or video), and/or type of Internet link information can be used to select a codec. A business policy including cost of using a particular codec and/or criticality of the call can also be considered in the selection of the codec.

In some embodiments, the interface can determine that the Internet link has a first bandwidth range (e.g., high bandwidth) or a second bandwidth range (e.g., low bandwidth). A high bandwidth codec can be selected in response to the Internet link having a high bandwidth or a low bandwidth codec can be selected in response to the Internet link having a low bandwidth, for example. In some examples, the system including the VoIP device does not have a particular codec, the VoIP device can borrow the particular codec from a different device.

In some examples, the different device can be a device from a transcoding service. In such an example, a transcoding service device can provide media conversion from a first codec to a second codec and can provide the converted codec to the system.

The Internet link can be a number of different types, including, but not limited to, ethernet, cellular, LTE, legacy, T1/Data, and digital subscriber line (DSL). A codec can be selected based on the type of Internet link being used. For example, a G711, G729, or a G723 codec can be selected for an ethernet link and an AMR-WB codec can be selected for an LTE Internet link.

In some embodiments, the device can detect a switch from a first Internet link to a second Internet link and the interface can determine a bandwidth, usage, and/or type of the second Internet link to select the codec. The switch from the first Internet link to the second Internet link can occur in response to low voice quality, low video quality, delays, jitter, or the first Internet link not responding. In some examples, a drop in quality of a call can be detected using a mean opinion score (MOS) and/or real time control protocol (RTCP) stats.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Also, as used herein, "a" or "a number of" something can refer to one or more such things. For example, "a number of operations" can refer to one or more operations.

FIG. 1 illustrates an example of a system including voice over Internet protocol (VoIP) devices according to one or more embodiments of the present disclosure. In the embodiment illustrated in FIG. 1, the system 100 includes a number of VoIP devices, a number of networks 102-1, 102-N (e.g., WAN networks), a number of network links 104-1, 104-P (wired or wireless), a number of local networks 106, a number of end communication devices that a party may use to communicate with another party over a connection through one of the network links 104-1, 104-P, and a number of intermediary devices 110 that provide a pathway to allow the passing of packets between networks 102-1, 102-N.

The system 100, shown in FIG. 1, includes two network connections (via networks 102-1 and 102-N) that can each be used by a party using the end device 108 to communicate with another party on a network that is communicating through intermediary device 110. In this manner, a communication session can be created between two parties, allowing them to communicate with each other.

As can be seen from the illustration in FIG. 1, a VoIP device 101 is connected to links to several networks. For instance, link 104-1 allows connection to network 102-1 and a unique IP address is provided to identify the device 101 with respect to that network. Link 104-P allows connection to network 102-N and a unique IP address (different from that used for network 102-1) is provided to identify the device 101 with respect to that network. Additionally, VoIP device 101 is also connected to a local network (LAN) through link 106-1 and a unique IP address (different from those used for networks 102-1, 102-N) is provided to identify the device 101 with respect to that network.

Figure 2:
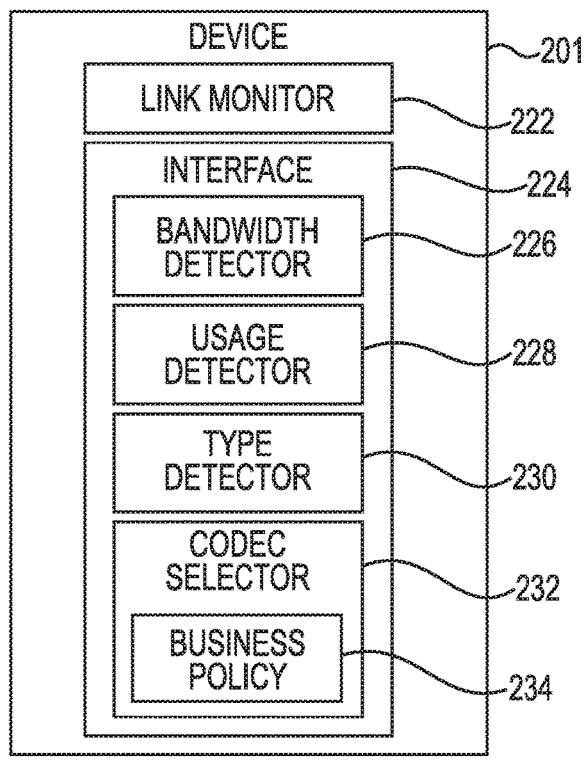
FIG. 2 illustrates an example of a device for selecting a codec according to one or more embodiments of the present disclosure.

FIG. 2 illustrates an example of a device for selecting a codec according to one or more embodiments of the present disclosure. The device 201 can be, for example, a VoIP device and/or an edge device. The device 201 can include a link monitor 222 coupled to an interface 224. In some examples, the device 201 can be acting as a back-to-back user agent for a VoIP device upstream from the device 201.

A back-to-back user agent can be a logical network element in session initial protocol (SIP) applications. A back-to-back user agent can operate between two end points of a call and/or a communication session and can divide the session in two call legs.

The back-to-back user agent can also mediate SIP signaling between both of the end points of the call from call establishment to termination. Via signaling, the back-to-back user agent can also change the codec selection by introducing a media transcoding functionality. For example, the media transcoding functionality can convert a traffic stream in a first codec to a traffic stream on a second codec.

In some embodiments, the interface 224 can include a bandwidth detector 226, a usage detector 228, a type detector 230, and a codec selector 232. The interface 224 can determine a bandwidth of an Internet link using the bandwidth detector 226.

The bandwidth detector 226 of the interface 224 can determine whether the Internet link has a first bandwidth range or a second bandwidth range. The bandwidth detector 226 can calculate the bandwidth using the amount of time it takes packets to be sent and received. This can be achieved by, for example, doing a packet timing operation as packets are sent or received at a device connected to a particular Internet link that is being checked for bandwidth.

In some examples, the first bandwidth range can be a high bandwidth and the second bandwidth range can be a low bandwidth. A high bandwidth codec can be selected in response to the Internet link having a high bandwidth or a low bandwidth codec can be selected in response to the Internet link having a low bandwidth, for example.

A bandwidth of a codec can be a function of its bit rate and its sample interval. A sample interval for a given bit rate can define the voice payload size.

For example, a G729 codec with a bit rate of 8 kilobits per second (kbps) and a sample interval of 20 milliseconds (ms) can have a voice payload size of 160 bits. In such an example, in 1 second, 50 packets can be sent.

This metric can be expressed as packets per second (PPS). If transport header size is X bits per packet then bandwidth= (X+voice payload size)×PPS. If the sample interval is the same and a G711 codec, with a bit rate of 64 kbps is used, it will take more bandwidth than a G729 codec, with an 8 kbps rate. In this example, G711 can be labeled a high bandwidth codec. In some examples, an AMR-WB codec with a 5.9 kbps can be labeled a low bandwidth codec because the AMR-WB codec can take less bandwidth for an equivalent voice quality. An appropriate high or low bandwidth codec can be selected based on the bandwidth of the internet link.

The interface 224 can determine a usage of the internet link using the usage detector 228. The usage detector 228 of the interface 224 can determine whether the Internet link is passing voice and/or video data.

The usage detector 228, using QoS statistical data collected by one or more devices on the system, can also detect what percentage of the Internet link is being used for voice data and what percentage of the Internet link is being used for video data.

The usage of the Internet link can also assist in selecting the codec for the Internet link. For example, a low bit rate codec can be preferred by an Internet link being used for voice data only.

The interface 224 can determine a type of the link through use of the type detector 230. The Internet link can be a number of different types, including, but not limited to, ethernet, cellular, LTE, legacy, T1/Data, and digital subscriber line (DSL).

In some examples, a type of Internet link may prefer a particular type of codec, so a codec can be selected based on the type of Internet link being used. For example, a G711, a G729, or a G723 codec can be selected for an ethernet link and an AMR-WB codec can be selected for an LTE Internet link because an AMR-WB, being a low bandwidth codec, is a preferred codec for an LTE Internet link.

The interface 224 of the device 201 can also include a codec selector 232. The codec selector 232 can select the codec based on the determination of the bandwidth, usage, and/or type of the Internet link.

The codec selector 232 can also take into consideration business policy 234 in selecting a codec. Business policy 234 considerations can include cost of using a particular codec, voice quality, video quality, and criticality of the call can also be considered in the selection of the codec. This selection can, for example, be made just prior to initiation of a call on the system, at the time just prior to the transfer of a data packet, when a change to a selection criterion has changed, or can be done periodically.

These codec selector factors can be weighted differently in some embodiments. For, example, bandwidth can be more critical in maintaining an undisturbed link than type of codec, so bandwidth could be weighted higher than type, usage, and/or business policy consideration.

In some examples multiple codec selector factors can be followed. For example, there may be two codec selector factors. The first codec selector factor could be a business policy 234 to maximize data throughput on a link during a certain time of day. The second codec selector factor could be another business policy 234 to maintain voice quality. The codec selector 232 could satisfy both codec selector factors by selecting a low bandwidth codec.

The link monitor 222 of device 201 can detect an Internet link. The link monitor 222 can detect the Internet link by monitoring the link electrical characteristics, link status, and/or by checking networking reachability, for example. The link monitor 222 can also detect a switch from a first Internet link to a second Internet link. The switch from the first Internet link to the second Internet link can occur in response to low voice quality, low video quality, delays, and/or the first Internet link not responding, for example.

Figure 3:
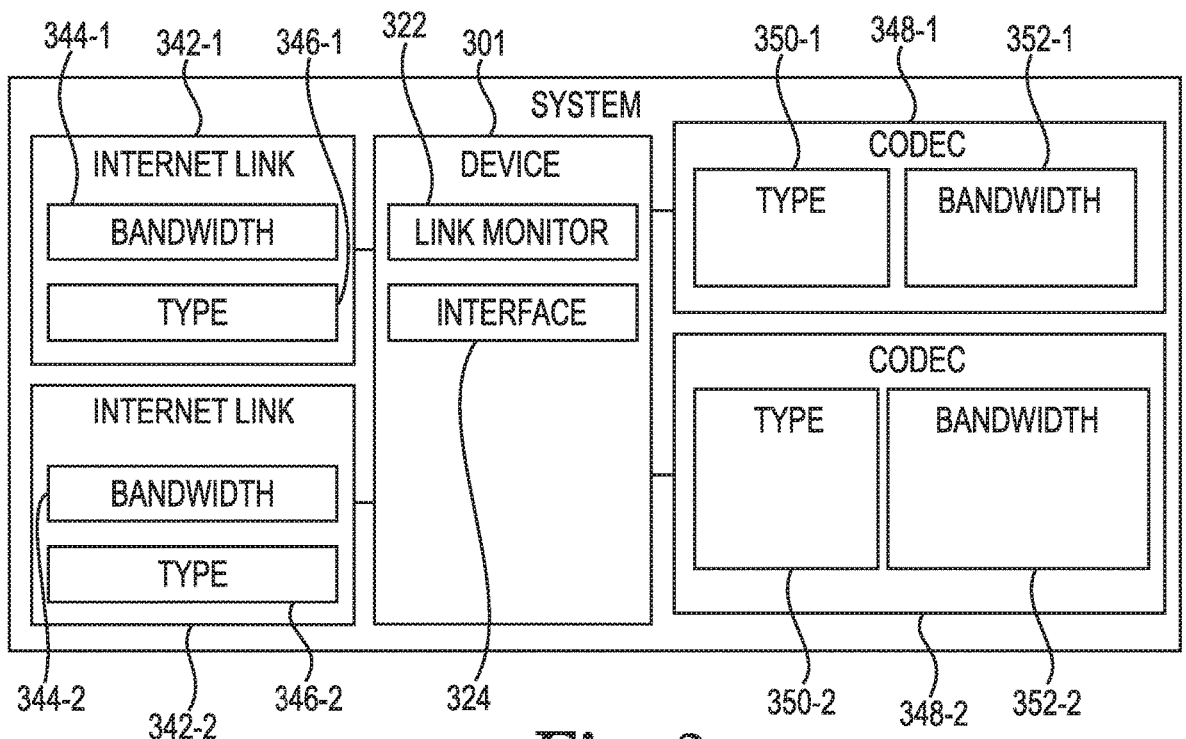
FIG. 3 illustrates an example of a system for selecting a codec according to one or more embodiments of the present disclosure.

FIG. 3 illustrates an example of a system for selecting a codec according to one or more embodiments of the present disclosure. The system 340 can include a first Internet link 342-1, a second Internet link 342-2, a device 301, a first codec 348-1, and a second codec 348-2.

The first Internet link 342-1 and the second Internet link 342-2 can be used for a VoIP call. The first Internet link 342-1 can be a primary link and the second Internet link 342-2 can be a redundant link, for example.

The system 340 can switch from the first Internet link 342-1 to the second Internet link 342-2 in response to the first Internet link 342-1 becoming unreliable or inaccessible. For example, the system 340 can switch from the first Internet link 342-1 to the second Internet link 342-2 in response to having difficulty maintaining the connection or the quality of the connection which can affect the parties' ability to communicate with each other.

In some embodiments, the first Internet link 342-1 can have a first Internet link bandwidth range 344-1 and be a first type 346-1 of Internet link. The second Internet link 342-2 can have a second Internet link bandwidth range 344-2 and be a second type 346-2 of Internet link. The first Internet link 342-1 and the second Internet link 342-2 can have different bandwidths, different usage, and/or can be different types of Internet links.

Similar to Internet links, there can be different types of codecs and codecs can have different bandwidths. For example, the first Internet link 342-1 can have a high bandwidth and be connected to a first codec 348-1.

In such an example, the first codec 348-1 can be a high bandwidth codec. And, as such, the first codec bandwidth range 348-1 can be high.

In response to disruptions, the second Internet link 342-2 can replace the first Internet link 342-1. The second Internet link 342-2 can have a low bandwidth. In this example, a high bandwidth codec, the first codec 348-1, is being underutilized by a low bandwidth Internet link, the second Internet link 342-2. As discussed herein, VoIP communication resources can be wasted when a codec is not selected based on the bandwidth, usage, and/or type of Internet link.

In some embodiments, the interface can select the first codec 348-1 with the first codec bandwidth range 352-1 to couple the first Internet link 342-1 to in response to the first codec bandwidth range 352-1 overlapping with at least a portion of the first Internet link bandwidth range 344-1. In some examples, the interface can select a second codec 348-2 with the second codec bandwidth range 352-2 to couple the second Internet link 342-2 to in response to the second codec bandwidth range 352-2 overlapping with at least a portion of the second Internet link bandwidth range 344-2.

In some embodiments, in response to the system 340 switching from the first Internet link 342-1 to the second Internet link 342-2, the system 340 can switch from the first codec 348-1 to the second codec 348-2. For example, the first codec 348-1 can be a first type of codec 350-1 preferred by the first Internet link 342-1.

Internet link preference can be based on compatibility, reliability, and quality of the call, for example. Preference can be determined, for example, by a list of settings determined by the manufacturer, set by a user of the system, and/or by a system administrator. The second Internet link 342-2 can prefer a second type of codec 350-2 and can use a second codec 348-2 that is the second type of codec 350-2 instead of the first codec 348-1 which was used by the first Internet link 342-1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A voice over Internet protocol (VoIP) device for selecting a codec, comprising:
    a link monitor to detect an Internet link by at least one of monitoring electrical characteristics, link status, or checking networking reachability of the Internet link; and
    an interface coupled to the link monitor, wherein the interface determines a bandwidth range of the Internet link, type of the Internet link, and usage of the Internet link and the determined bandwidth range of the Internet link and the determined type of the Internet link are used to select the codec, and wherein the bandwidth range of the Internet link is calculated using an amount of time it takes a packet to be sent and received, the type of the Internet link is an ethernet, cellular, LTE, legacy, T11/Data, or digital subscriber line (DSL), and the usage of the Internet link includes a percentage of the Internet link used for voice data and a percentage of the Internet link used for video data.

2. The device of claim 1, wherein the interface determines the Internet link has a high bandwidth.

3. The device of claim 2, wherein the codec is selected in response to the codec having a high bandwidth.

4. The device of claim 1, wherein the interface determines the Internet link has a low bandwidth.

5. The device of claim 4, wherein the codec is selected in response to the codec having a low bandwidth.

6. The device of claim 5, wherein the interface determines the Internet link to be a first type of link.

7. The device of claim 6, wherein the codec is selected in response to the codec being the first type of link.

8. An edge device, acting as a back-to-back user agent for a VoIP device upstream, for selecting a codec during a call, comprising:
a link monitor to detect a switch from a first Internet link to a second Internet link; and
an interface coupled to the first Internet link and the second Internet link, wherein the interface determines a bandwidth range of the second Internet link, type of the second Internet link, and usage of the second Internet link and the determined bandwidth range of the second Internet link and the determined type of the second Internet link are used to select the codec, wherein the type of the second Internet link is an ethernet, cellular, LTE, legacy, T11/Data, or digital subscriber line (DSL), the usage of the second Internet link includes a percentage of the second Internet link used for voice data and a percentage of the second Internet link used for video data, and the bandwidth range of the second Internet link is calculated by a bandwidth detector using a packet timing operation.

9. The device of claim 8, wherein the usage of the second Internet link includes a quantity of voice usage and a quantity of video usage.

10. The device of claim 8, wherein a business policy is considered in the selection of the codec.

11. The device of claim 10, wherein the business policy includes cost of using the codec.

12. The device of claim 10, wherein the business policy includes criticality of the call.

13. The device of claim 8, wherein the switch from the first Internet link to the second Internet link occurs in response to low voice quality, low video quality, delays, or the first Internet link not responding.

14. The device of claim 8, wherein the codec is borrowed from a different device.

15. A system for selecting a codec for a call, comprising:
a link monitor to detect a first Internet link by monitoring at least one of electrical characteristics, link status, or checking networking reachability of the first Internet link; and
an interface coupled to the first Internet link, wherein the interface determines a first bandwidth range of the first Internet link, type of the first Internet link, and usage of the first Internet link and the determined first bandwidth range of the first Internet link, the determined type of the first Internet link, and the determined usage of the first Internet link are used to select a first codec to couple the first Internet link to, wherein the first bandwidth range of the first Internet link is calculated using an amount of time it takes a packet to be sent and received, the type of the first Internet link is an ethernet, cellular, LTE, legacy, T11/Data, or digital subscriber line (DSL), and the usage of the first Internet link includes a percentage of the first Internet link used for voice data and a percentage of the first Internet link used for video data, and wherein the first codec bandwidth range overlaps with at least a portion of the first-bandwidth range.

16. The system of claim 15, wherein the link monitor detects the first Internet link switching to a second Internet link.

17. The system of claim 16, wherein the first Internet link is a first type of Internet link and the second Internet link is a second type of Internet link.

18. The system of claim 17, wherein the interface selects a second codec that is a second type of codec to couple to the second Internet link.

19. The system of claim 16, wherein the second Internet link has a second bandwidth range.

20. The system of claim 19, wherein the interface selects a second codec with a second codec bandwidth range to couple the second Internet link to, wherein the second codec bandwidth range overlaps at least a portion of the second Internet link bandwidth range.

* * * * *